United States Patent
Cho et al.

(10) Patent No.: US 10,847,808 B2
(45) Date of Patent: Nov. 24, 2020

(54) METHODS FOR MANUFACTURING FUEL CELL ELECTRODES AND ELECTRODES FORMED USING THE SAME

(71) Applicants: Hyundai Motor Company, Seoul (KR); Kia Motors Corporation, Seoul (KR)

(72) Inventors: Yoon Hwan Cho, Yongin-si (KR); Su Won Seol, Yongin-si (KR); Ji Hoon Yang, Hwaseong-si (KR); Young Taek Kim, Yeonsu-gu (KR); Dae Yong Son, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 182 days.

(21) Appl. No.: 15/836,579

(22) Filed: Dec. 8, 2017

(65) Prior Publication Data
US 2019/0131630 A1    May 2, 2019

(30) Foreign Application Priority Data
Nov. 2, 2017    (KR) .......................... 10-2017-0145187

(51) Int. Cl.
*H01M 8/00*    (2016.01)
*H01M 4/86*    (2006.01)
(Continued)

(52) U.S. Cl.
CPC ....... *H01M 4/8663* (2013.01); *H01M 4/8605* (2013.01); *H01M 4/881* (2013.01);
(Continued)

(58) Field of Classification Search
CPC .. H01M 4/8663; H01M 4/8605; H01M 4/881; H01M 4/8814; H01M 4/8828; H01M 4/9041; H01M 4/92
See application file for complete search history.

(56) References Cited

U.S. PATENT DOCUMENTS

| 7,962,965 B2 | 6/2011 | Ohyama |
| 2008/0084064 A1 | 4/2008 | Kerin et al. |

(Continued)

FOREIGN PATENT DOCUMENTS

| JP | 5887453 B1 | 3/2016 |
| KR | 20070009718 A | 1/2007 |

(Continued)

OTHER PUBLICATIONS

US 9,461,313 B2, 10/2016, Nagamori et al. (withdrawn)

*Primary Examiner* — Raymond Alejandro
(74) *Attorney, Agent, or Firm* — Slater Matsil, LLP

(57) ABSTRACT

A method for manufacturing a fuel cell electrode includes forming a first mixture by mixing a first cation exchange resin, a metal catalyst, and a first solvent, powderizing the first mixture to produce a first catalyst powder comprising the metal catalyst coated with the first cation exchange resin, forming a second mixture by mixing the first catalyst powder, a second cation exchange resin, and a second solvent, powderizing the second mixture to produce a catalyst powder having a core and two or more layers of shells and being coated with the second cation exchange resin, mixing the catalyst powder having the core and two or more layers of shells with a third solvent to produce a catalyst slurry, and coating, using the catalyst slurry, to produce an electrode.

18 Claims, 1 Drawing Sheet

(51) Int. Cl.
*H01M 4/90* (2006.01)
*H01M 4/88* (2006.01)
*H01M 4/92* (2006.01)

(52) U.S. Cl.
CPC ....... *H01M 4/8814* (2013.01); *H01M 4/8828* (2013.01); *H01M 4/9041* (2013.01); *H01M 4/92* (2013.01)

(56) References Cited

U.S. PATENT DOCUMENTS

| | | | |
|---|---|---|---|
| 2010/0003400 A1* | 1/2010 | Tanuma | H01M 8/1004 427/115 |
| 2010/0316862 A1 | 12/2010 | Puppe et al. | |
| 2013/0052560 A1* | 2/2013 | Kawaji | H01M 8/1009 429/482 |
| 2016/0104896 A1* | 4/2016 | Nishida | H01M 4/8828 429/531 |
| 2016/0322644 A1 | 11/2016 | Nagamori et al. | |

FOREIGN PATENT DOCUMENTS

| | | |
|---|---|---|
| KR | 20080031828 A | 4/2008 |
| KR | 20100126261 A | 12/2010 |
| KR | 20120135691 A | 12/2012 |
| KR | 20130112208 A | 10/2013 |

\* cited by examiner

US 10,847,808 B2

METHODS FOR MANUFACTURING FUEL CELL ELECTRODES AND ELECTRODES FORMED USING THE SAME

CROSS-REFERENCE TO RELATED APPLICATIONS

This application claims priority to Korean Patent Application No. 10-2017-0145187, filed on Nov. 2, 2017, which application is hereby incorporated herein by reference.

TECHNICAL FIELD

The present invention relates to fuel cells, and in particular method for manufacturing electrode in polymer electrolyte fuel cell and electrode using the same.

BACKGROUND

Conventionally, a catalyst slurry was prepared using a cation exchange resin, a catalyst and a solvent in order to produce an electrode for fuel cells. However, the cation exchange resin does not continue evenly contacting the catalyst, and resistance to substance delivery was disadvantageously increased according to temperature and humidity conditions during operation of fuel cells due to use of one kind of cation exchange resin.

In this regard, Korean Patent Laid-open Nos. 2007-9718, 2008-31828 and 2012-135691 disclose methods of manufacturing electrodes using conductive nanoparticles having a multilayer structure including a core and a shell. However, disadvantageously, such methods do not enable the cation exchange resin to continue evenly contacting the catalyst and involve deterioration in the function of transferring substances into the electrodes.

Therefore, there is still a need for development of methods of manufacturing electrodes for fuel cells that can improve the performance of fuel cells and enhance the function of mass transfer into the electrode, and electrodes manufactured by the methods.

The above information disclosed in this Background section is only for enhancement of understanding of the background of the invention and therefore it may contain information that does not form the prior art that is already known to a person of ordinary skill in the art.

SUMMARY

In one embodiment, a method for manufacturing a polymer electrolyte electrode for fuel cells includes forming a first mixture by mixing a first cation exchange resin, a metal catalyst, and a solvent. The method further includes powderizing the first mixture to produce a first catalyst powder comprising the metal catalyst coated with the first cation exchange resin. The method further includes forming a second mixture by mixing the first catalyst powder, a second cation exchange resin, and a solvent. The method further includes powderizing the second mixture to produce a catalyst powder having a core and two or more layers of shells and being coated with the second cation exchange resin. The method further includes mixing the catalyst powder having a core and two or more layers of shells with a solvent to produce a catalyst slurry. The method further includes coating the catalyst slurry to produce an electrode.

In another embodiment, a method for manufacturing a polymer electrolyte electrode for fuel cells includes providing a first mixture comprising a mixture of a first cation exchange resin, a metal catalyst, and a solvent. The metal catalyst is coated with the first cation exchange resin to produce a first catalyst powder. A second mixture comprising a mixture of the first catalyst powder, a second cation exchange resin, and a solvent is provided. The second mixture is powderized to produce a second catalyst powder having a core and two or more layers of shells and being coated with the second cation exchange resin. An equivalent weight of the second cation exchange resin is less than an equivalent weight of the first cation exchange resin. The second catalyst powder is mixed with a solvent to produce a catalyst slurry. The catalyst slurry is used to produce an electrode.

Also, in another aspect, the present invention provides a polymer electrolyte electrode for fuel cells manufactured by the above methods.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION OF ILLUSTRATIVE EMBODIMENTS

Figure 1:
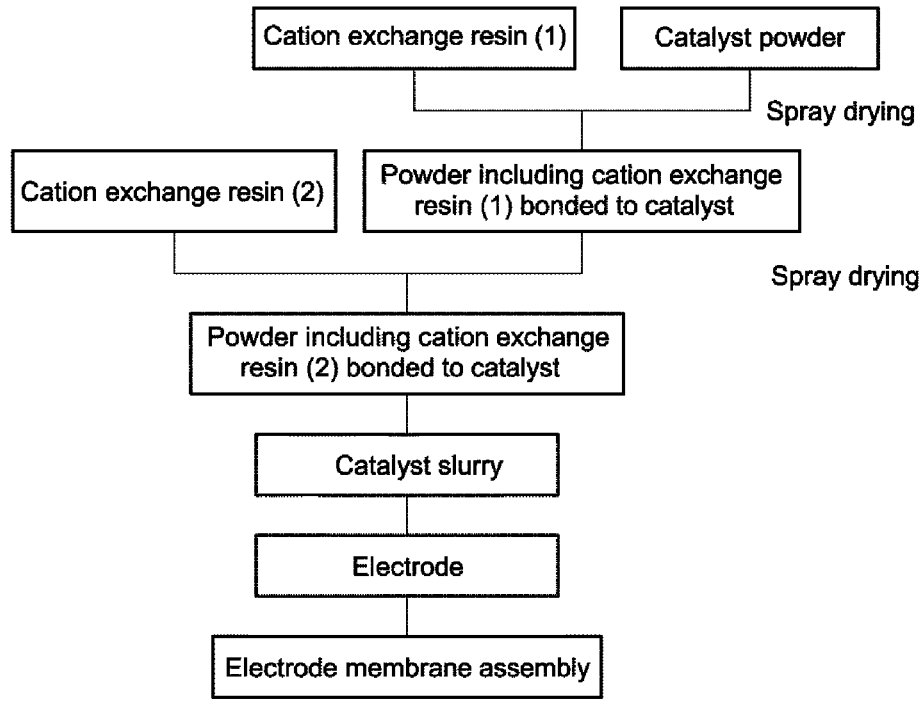
FIG. 1 is a flowchart illustrating a process of manufacturing a polymer electrolyte electrode for fuel cells according to the present invention.

The present invention has been made in an effort to solve the above-described problems associated with the prior art.

Therefore, the present inventors completed the present invention based on the finding that when, in the production of a polymer electrolyte electrode for fuel cells, a catalyst, which has been powderized using a spray dryer while bringing cation exchange resins into contact with the catalyst, is mixed with a solvent to produce a catalyst slurry and the catalyst slurry is used to produce an electrode, the cation exchange resins can evenly contact the catalyst in the electrode and the performance of the electrode for fuel cells can be improved. In addition, it could be seen that, by sequentially contacting two or more kinds of cation exchange resins, the structures of the catalyst and the cation exchange resins in the electrode can be easily controlled and the capability to transfer substances into the electrode can thus be enhanced.

The present invention relates to a method for manufacturing a polymer electrolyte electrode for fuel cells that can improve performance of the electrode for fuel cells and the capability to transfer substances into the electrode by sequentially bringing two kinds of cation exchange resins into contact with catalysts, powderizing the same and incorporating a catalyst having a multilayer structure including a core and two or more layers of shells into the electrode for fuel cells, and an electrode manufactured by the method.

Accordingly, an embodiment of the present invention provides a method of manufacturing a polymer electrolyte electrode for fuel cells.

Also, another embodiment of the present invention provides a polymer electrolyte electrode for fuel cells manufactured by the method.

The embodiments of the present invention are not limited to those described above. The embodiments of the present invention will be clearly understood from the following description and could be implemented by means defined in the claims and a combination thereof.

The embodiments described above, and other embodiments, features and advantages will be clearly understood from the following preferred embodiments with reference to the annexed drawings. However, the present invention is not limited to these embodiments and will be embodied in different forms. The embodiments are suggested only to offer thorough and complete understanding of the disclosed contents and sufficiently inform those skilled in the art of the technical concept of the present invention.

Like numbers refer to like elements throughout the description of the figures. In the drawings, the sizes of structures are exaggerated for clarity. It will be understood that, although the terms first, second, etc. may be used herein to describe various elements, these elements should not be limited by these terms and are used only to distinguish one element from another. For example, within the scope defined by the present invention, a first element may be referred to as a second element and similarly, the second element may be referred to as the first element. Singular forms are intended to include plural forms as well, unless context clearly indicates otherwise.

It will be further understood that the terms "comprises" and/or "has," when used in this specification, specify the presence of stated features, integers, steps, operations, elements, components or combinations thereof, but do not preclude the presence or addition of one or more other features, integers, steps, operations, elements, components, or combinations thereof. In addition, it will be understood that when an element such as a layer, film, region or substrate is referred to as being "on" another element, it can be directly on the other element or an intervening element may also be present. It will also be understood that when an element such as a layer, film, region or substrate is referred to as being "under" another element, it can be directly under the other element or an intervening element may also be present.

Unless context clearly indicates otherwise, all numbers, values and/or expressions that express ingredients, reaction conditions, polymer compositions and amounts of mixtures used in the specification are approximations that reflect various uncertainties of measurement occurring inherently in obtaining these values among other things. For this reason, it should be understood that in all cases, the term "about" should modify all the numbers, values and/or expressions. In addition, when number ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the scopes of ranges. In addition, for example, the range of "10% to 30%" encompasses all integers that include figures such as 10%, 11%, 12% and 13% and all integers up to 30% and any sub-ranges of 10% to 15%, 12% to 18%, or 20% to 30%, as well as any figures, such as 10.5%, 15.5% and 25.5%, between appropriate integers that fall within the scopes of ranges.

Embodiments of the present invention provides a method for manufacturing an electrode for fuel cells that includes sequentially mixing two or more kinds of cation exchange resins with a catalyst, powderizing the mixture using a spray dryer, mixing the resulting catalyst powder having a core and two or more layers of shells with a solvent to prepare a catalyst slurry and producing an electrode in order to improve performance of the electrode for fuel cells.

By sequentially bringing two kinds of cation exchange resins into contact with metal catalysts, a catalyst having a multilayer structure including a core and two or more layers of shells can be produced. Furthermore, by incorporating the catalyst into an electrode for fuel cells, the performance of electrode for fuel cells and the function of transferring substances into the electrode can be improved.

More specifically, the present invention provides a method for manufacturing a polymer electrolyte electrode for fuel cells that includes (a) mixing a first cation exchange resin, a metal catalyst and a solvent, and powderizing the resulting mixture to produce a first catalyst powder coated with the first cation exchange resin, (b) mixing the first catalyst powder, a second cation exchange resin and a solvent, and powderizing the resulting mixture to produce a catalyst powder including a core and two or more layers of shells and being coated with the second cation exchange resin, (c) mixing the catalyst powder having the core and two or more layers of shells with a solvent to prepare a catalyst slurry, and (d) coating the catalyst slurry to produce an electrode.

First, in step (a), the first cation exchange resin, the metal catalyst and the solvent are mixed and powderized to produce the first catalyst powder coated with the first cation exchange resin. Specifically, the cation exchange resin is mixed with the catalyst and the solvent, and the cation exchange resin bonded to the catalyst is powderized using a spray dryer.

In this case, the solvent may include one or more alcohols selected from the group consisting of ethanol, propanol and butanol, as well as distilled water.

The first cation exchange resin may be selected from the group consisting of polysulfone resins, polyether ketone resins, polyether resins, polyester resins, polybenzimidazole resins, polyimide resins, polyphenylene sulfide resins, polyphenylene oxide resins and NAFION that comprises sulfonate groups in a tetrafluoroethylene backbone comprising fluorine.

The metal catalyst may include one or more selected from the group consisting of platinum, palladium, iridium, rhodium, gold, silver, cobalt and nickel, and an alloy of two or more thereof. Any metal catalyst may be used without any limitation so long as it can be used in the art.

The first cation exchange resin, the catalyst and the solvent are mixed, and are then dispersed using a stirrer, disperser or ultrasonic disperser. The dispersed mixture is powderized by drying using a spray dryer. At this time, the drying temperature is preferably 80° C. to 200° C., more preferably 90° C. to 150° C. When the drying temperature is less than 80° C., there is a limitation on drying the solvent, and when the drying temperature exceeds 200° C., there is a limitation on maintaining the cation exchange resin. Therefore, the drying is preferably carried out within the temperature range.

Then, in step (b), the first catalyst powder prepared in step (a), the second cation exchange resin and the solvent are mixed and powderized to produce a catalyst powder having a core and two or more layers of shells and being coated with the second cation exchange resin. At this time, the second cation exchange resin may be selected from the group consisting of polysulfone resins, polyether ketone resins, polyether resins, polyester resins, polybenzimidazole resins, polyimide resins, polyphenylene sulfide resins, polyphenylene oxide resins and NAFION that comprises sulfonate groups in a tetrafluoroethylene backbone comprising fluorine. The second cation exchange resin is preferably different from the first cation exchange resin. Particularly preferably, the first cation exchange resin is a polysulfone resin having an equivalent weight of 750 or more and the second cation exchange resin is a polysulfone resin having an equivalent weight of 700 or less.

Furthermore, the powderization method is the same as described in step (a). Specifically, the first cation exchange resin, the catalyst and the solvent are mixed, and are then dispersed using a stirrer, disperser or ultrasonic disperser. The dispersed mixture is powderized by drying using a spray dryer. At this time, the drying temperature is preferably 80° C. to 200° C., more preferably 90° C. to 150° C.

The catalyst having undergone steps (a) and (b) is a catalyst that has a multilayer structure including a core and two or more layers of shells, and exhibits excellent conductivity and substance transfer performance.

The catalyst powder including a core and two or more layers of shells thus produced is mixed with a solvent to prepare a catalyst slurry (c).

Then, in step (d), the catalyst slurry is coated to produce an electrode. The electrode is produced by directly coating release paper or an electrolyte film with the catalyst slurry by spray coating, bar coating or slot-die coating. In this case, the release paper may include one or more films selected from the group consisting of polyethylene naphthalate (PEN), polyethylene terephthalate (PET), and polytetrafluoroethylene (PTFE) films, and any release paper may be used without limitation so long as it is used in the art.

When the electrode is produced using release paper in the manufacturing process, a membrane electrode assembly (MEA) can be produced by transferring the electrode to an electrolyte membrane and hot pressing may be used for electrode transfer. When the electrode is directly coated on the electrolyte membrane, there is no need for electrode transfer.

The method according to the present invention can be widely used to manufacture polymer electrolyte electrodes for fuel cells because the performance of electrodes for fuel cells and substance transfer function can be improved by sequentially bringing two kinds of cation exchange resins into contact with catalysts and incorporating a catalyst having a multilayer structure including a core and two or more layers of shells into the electrode for fuel cells.

Hereinafter, the present invention will be described in more detail with reference to examples. However, these examples should not be construed as limiting the scope of the present invention.

EXAMPLE 1

Electrode Manufactured by the Method According to the Present Invention

A platinum catalyst was mixed with distilled water in a homomixer at 4,000 rpm for 30 minutes, a cation exchange resin was added thereto and the resulting mixture was stirred at 4,000 rpm for 3 minutes. In addition, the reaction solution was dried at 130° C. using a spray dryer to produce a catalyst powder having a cation exchange resin in the form of a single layer.

The powder including a mixture of the platinum catalyst and the cation exchange resin was added to distilled water and mixed at 4,000 rpm for 30 minutes and a different kind of cation exchange resin was added thereto and the resulting mixture was dispersed at 4,000 rpm for 30 minutes. In addition, the dispersion was dried at 130° C. using a spray dryer to produce a catalyst powder having different kinds of cation exchange resins in the form of double layers.

In addition, the catalyst powder having cation exchange resins in the form of double layers was mixed with propanol to produce a slurry using a planetary mixer.

The produced slurry was applied to a thickness of 15 μm onto a PTFE film and at 80° C. for 12 hours to produce an electrode.

COMPARATIVE EXAMPLE 1

Electrode Manufactured by Conventional Manufacturing Method

A platinum catalyst was mixed with propanol, a cation exchange resin was added thereto and a slurry was produced using a planetary mixer.

The produced slurry was applied onto a PTFE film to a thickness of 15 μm and dried at 80° C. for 12 hours to produce an electrode.

COMPARATIVE EXAMPLE 2

Electrode Manufactured Using Catalyst Having Single-Layer Core-Shell

The platinum catalyst was mixed with distilled water using a homomixer at 4,000 rpm for 30 minutes, a cation exchange resin was added and the resulting mixture was dispersed at 4,000 rpm for 30 minutes. In addition, the reaction solution was dried at 130° C. using a spray dryer to produce a catalyst powder having a cation exchange resin in the form of a single layer.

In addition, the catalyst powder having one kind of cation exchange resin in the form of a single layer was mixed with propanol to produce a slurry using a planetary mixer.

The produced slurry was applied to a thickness of 15 μm onto a PTFE film and at 80° C. for 12 hours to produce an electrode.

TEST EXAMPLE 1

Evaluation of Improvement in Performance of Fuel Cells

Figure 2:
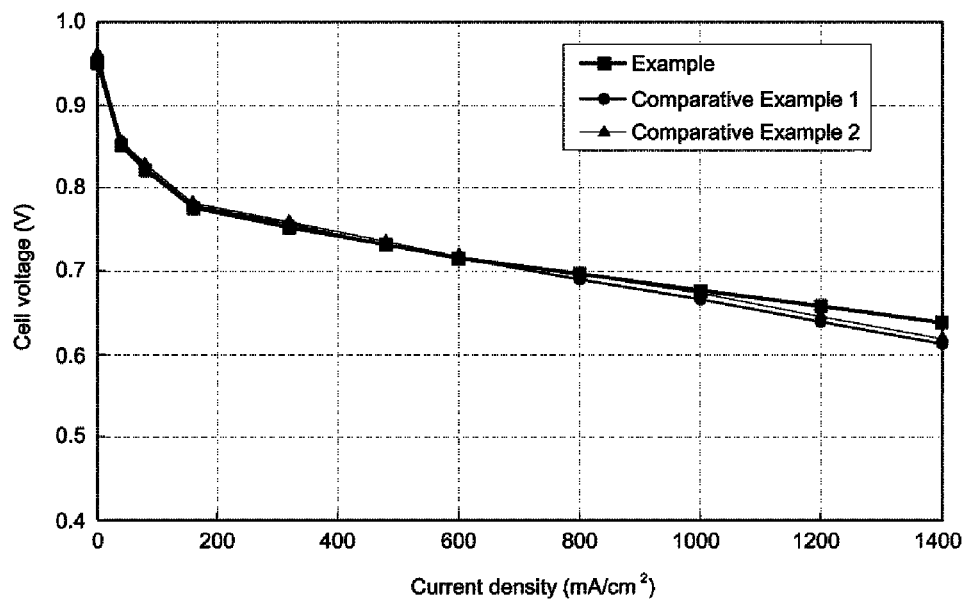
FIG. 2 shows single-cell performance of Test Example using electrodes manufactured in Example according to the present invention and Comparative Example.

The electrodes manufactured in Example and Comparative Example were hot-pressed at 140° C. and at a pressure of 10 bar for 2 minutes on the electrolyte membrane provided with the anode catalyst layer produced from the platinum catalyst and the PTFE film was removed to produce a membrane electrode assembly. FIG. 2 shows single-cell performance of the membrane electrode assembly produced in Test Example.

As can be seen from results of FIG. 2, Example according to the present invention exhibited a voltage of 0.658V at 1,200 mA/cm2.

On the other hand, Comparative Example 1, which is a conventional manufacturing method, exhibited 0.641V at 1,200 mA/cm2. In addition, although electrodes were produced by the method according to the present invention, like Comparative Example 2, in case where the cation exchange resin was a single layer, results were unsatisfactory within a current density range of 1,000 mA/cm2 or more.

Accordingly, the method according to the present invention includes sequentially bringing different kinds of cation exchange resins into contact with catalysts and incorporating a catalyst having a multilayer structure including a core and two or more layers of shells into an electrode for fuel cells, thereby improving performance of the electrode for fuel cells and the capability to transfer substances into the electrode, and being widely used to manufacture polymer electrolyte electrodes for fuel cells.

As apparent from the fore-going, the manufacturing method according to the present invention includes sequentially bringing different kinds of cation exchange resins into contact with catalysts and then powderizing, so that the cation exchange resins can evenly contact the catalysts and the performance of the electrode for fuel cells can thus be improved.

Furthermore, the inner structure of the electrode can be controlled by separately using the cation exchange resin directly contacting the catalyst and the cation exchange resin directly not contacting the catalyst by sequentially applying two kinds of cation exchange resins to processes. As a result, the capability to transfer substances into the electrode can be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a fuel cell electrode, the method comprising:
   forming a first mixture by mixing a first cation exchange resin, a metal catalyst, and a first solvent;
   powderizing the first mixture to produce a first catalyst powder comprising the metal catalyst coated with the first cation exchange resin;
   forming a second mixture by mixing the first catalyst powder, a second cation exchange resin, and a second solvent;
   powderizing the second mixture to produce a catalyst powder having a core and two or more layers of shells and being coated with the second cation exchange resin;
   mixing the catalyst powder having the core and two or more layers of shells with a third solvent to produce a catalyst slurry; and
   coating, using the catalyst slurry, to produce an electrode.

2. The method according to claim 1, wherein powderizing the first mixture and powderizing the second mixture is carried out using a spray dryer at a temperature of 80° C. to 200° C.

3. The method according to claim 1, wherein the first cation exchange resin or the second cation exchange resin is selected from the group consisting of polysulfone resins, polyether ketone resins, polyether resins, polyester resins, polybenzimidazole resins, polyimide resins, polyphenylene sulfide resins, and polyphenylene oxide resins.

4. The method according to claim 1, wherein the first cation exchange resin is a polysulfone resin having an equivalent weight of 750 or more, and the second cation exchange resin is a polysulfone resin having an equivalent weight of 700 or less.

5. The method according to claim 1, wherein the metal catalyst includes an element selected from the group consisting of platinum, palladium, iridium, rhodium, gold, silver, cobalt and nickel.

6. The method according to claim 1, wherein the electrode is produced by directly coating on a release paper or an electrolyte film with the catalyst slurry by spray coating, bar coating or slot-die coating.

7. The method according to claim 6, wherein the release paper comprises a film selected from the group consisting of polyethylene naphthalate (PEN), polyethylene terephthalate (PET), and polytetrafluoroethylene (PTFE).

8. The method according to claim 1, further comprising forming a membrane electrode assembly (MEA) by transferring the electrode to an electrolyte membrane and hot pressing.

9. The method according to claim 1, wherein the electrode is directly coated on an electrolyte membrane.

10. The method according to claim 1, further comprising forming a dispersed first mixture by dispersing the first mixture using a stirrer, disperser or ultrasonic disperser, wherein the powderizing the first mixture comprises drying the dispersed first mixture using a spray dryer.

11. A method for manufacturing a fuel cell electrode, the method comprising:
    providing a first mixture comprising a mixture of a first cation exchange resin, a metal catalyst, and a first solvent;
    coating the metal catalyst with the first cation exchange resin to produce a first catalyst powder;
    providing a second mixture comprising a mixture of the first catalyst powder, a second cation exchange resin, and a second solvent;
    powderizing the second mixture to produce a second catalyst powder having a core and two or more layers of shells and being coated with the second cation exchange resin, wherein an equivalent weight of the second cation exchange resin is less than an equivalent weight of the first cation exchange resin;
    mixing the second catalyst powder with a third solvent to produce a catalyst slurry; and
    using the catalyst slurry to produce an electrode.

12. The method according to claim 11, wherein coating the first catalyst powder and powderizing the second mixture is carried out using a spray dryer at a temperature of 80° C. to 200° C.

13. The method according to claim 11, wherein the first cation exchange resin or the second cation exchange resin is selected from the group consisting of polysulfone resins, polyether ketone resins, polyether resins, polyester resins, polybenzimidazole resins, polyimide resins, polyphenylene sulfide resins, and polyphenylene oxide resins.

14. The method according to claim 11, wherein the first cation exchange resin is a polysulfone resin having an equivalent weight of 750 or more, and the second cation exchange resin is a polysulfone resin having an equivalent weight of 700 or less.

15. The method according to claim 11, wherein the metal catalyst includes an element selected from the group consisting of platinum, palladium, iridium, rhodium, gold, silver, cobalt and nickel.

16. The method according to claim 11, wherein the electrode is produced by directly coating on a release paper or an electrolyte film with the catalyst slurry by spray coating, bar coating, or slot-die coating, wherein the release paper comprises a film selected from the group consisting of polyethilene naftenate (PEN), polyethylene terephthalate (PET), and polytetrafluoroethylene (PTFE).

17. The method according to claim 11, further comprising forming a membrane electrode assembly (MEA) by transferring the electrode to an electrolyte membrane and hot pressing.

18. The method according to claim 11, further comprising forming a dispersed first mixture by dispersing the first mixture using a stirrer, disperser or ultrasonic disperser, wherein the powderizing the first mixture comprises drying the dispersed first mixture using a spray dryer.

* * * * *